(12) United States Patent
Vasko et al.

(10) Patent No.: US 7,836,168 B1
(45) Date of Patent: Nov. 16, 2010

(54) SYSTEM AND METHODOLOGY PROVIDING FLEXIBLE AND DISTRIBUTED PROCESSING IN AN INDUSTRIAL CONTROLLER ENVIRONMENT

(75) Inventors: David A. Vasko, Macedonia, OH (US); John Joseph Baier, Mentor, OH (US); Richard Alan Morse, Hudson, OH (US); Brian Alan Batke, Novelty, OH (US); John Nesi, Chagrin Falls, OH (US); Douglas R. Wylie, Eastlake, OH (US); Paul David Brooks, Tervuren (BE); David Michael Callaghan, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1232 days.

(21) Appl. No.: 11/381,530

(22) Filed: May 3, 2006

Related U.S. Application Data

(62) Division of application No. 10/162,264, filed on Jun. 4, 2002, now Pat. No. 7,058,712.

(51) Int. Cl.
*G06F 15/173* (2006.01)
(52) U.S. Cl. ...................... 709/224; 709/226
(58) Field of Classification Search .................. 709/224, 709/226
See application file for complete search history.

(56) References Cited

U.S. PATENT DOCUMENTS 4,466,063 A * 8/1984 Segarra et al. ............... 709/226
5,127,090 A 6/1992 Ruehle et al.
5,402,350 A 3/1995 Kline (Continued)

FOREIGN PATENT DOCUMENTS

WO WO2006/041542 A2 4/2006

OTHER PUBLICATIONS

"Exploiting Parallelism in High Performance Embedded System Scheduling", Binoy Ravindran and Lonnie R. Welch, High Performance Computing, 1996 Proceedings, 3rd International Conference on Trivandrum, India Dec. 19-22, 1996, Los Alamitos, CA, USA. IEEE Comput. Soc. Dec. 19, 1996, pp. 400-405, XP010206066, ISBN: 978-0-8186-7557-7.

(Continued)

*Primary Examiner*—Kenny S Lin
(74) *Attorney, Agent, or Firm*—Turocy & Watson LLP; R. Scott Speroff; John M. Miller

(57) ABSTRACT

The present invention relates to a system and methodology facilitating flexible resource distribution in an industrial control environment. A query component is provided to determine one or more system resources from a networked industrial controller system, wherein the resources can include listings of applications, configurations, variable settings, and performance capabilities associated with a controller. Upon receiving available resource listings from various control devices, a distribution component can update the devices based in part on the resource listings and according to various criteria. A configuration component can be utilized in the controller system to provide network updates of controller parameters and to facilitate automated protocol selections when interacting with out-of-network devices. An analysis component can interact with the query, distribution, and configuration components to support higher-level decision-making in the resource distribution and allocation process.

15 Claims, 8 Drawing Sheets

U.S. PATENT DOCUMENTS

| | | |
|---|---|---|
| 5,710,723 A | 1/1998 | Hoth et al. |
| 5,805,442 A | 9/1998 | Crater et al. |
| 5,966,300 A | 10/1999 | Flood et al. |
| 6,201,996 B1 | 3/2001 | Crater et al. |
| 6,330,482 B1 | 12/2001 | McCain et al. |
| 6,370,582 B1 | 4/2002 | Lim et al. |
| 6,385,497 B1 | 5/2002 | Ogushi et al. |
| 6,401,054 B1 | 6/2002 | Andersen |
| 6,532,426 B1 | 3/2003 | Hooks et al. |
| 6,675,226 B1 | 1/2004 | Nair et al. |
| 6,801,813 B2 | 10/2004 | Kay et al. |
| 6,819,960 B1 | 11/2004 | McKelvey et al. |
| 6,842,454 B2 | 1/2005 | Metcalf, III |
| 6,845,401 B1 | 1/2005 | Papadopoulos et al. |
| 7,151,966 B1 * | 12/2006 | Baier et al. .................. 700/19 |
| 2001/0016880 A1 | 8/2001 | Cai et al. |
| 2002/0107962 A1 | 8/2002 | Richter et al. |
| 2003/0014465 A1 | 1/2003 | Mugica et al. |
| 2003/0061384 A1 | 3/2003 | Nakatani |
| 2003/0172220 A1 * | 9/2003 | Hao .......................... 710/305 |
| 2003/0208498 A1 | 11/2003 | Feinberg et al. |

OTHER PUBLICATIONS

"Automated Monitoring of Manufacturing Processes, Part 1: Monitoring Methods", R. Du et al., Transactions of the American Society of Mechanical Engineers, Series B: Journal of Engineering for Industry, ASME. New York, US, vol. 117, No. 2, May 1, 1995, pp. 121-132, XP000521507, ISSN: 0022-0817.

"ManufAg: a multi-agent system framework for production control of complex manufacturing systems", Lars Monch et al., Information Systems and E-Business Management, Springer, Berlin, DE, vol. 4, No. 2, Apr. 1, 2006, pp. 159-185, XP019357185, ISSN: 1617-9854.

Extended European Search Report for EP Application No. 07008973.5, dated Jul. 27, 2009, 8 pages.

\* cited by examiner

SYSTEM AND METHODOLOGY PROVIDING FLEXIBLE AND DISTRIBUTED PROCESSING IN AN INDUSTRIAL CONTROLLER ENVIRONMENT

CROSS-REFERENCE TO RELATED APPLICATIONS

This application is a divisional of U.S. patent application Ser. No. 10/162,264, which was filed on Jun. 4, 2002, and entitled, "SYSTEM AND METHODOLOGY PROVIDING FLEXIBLE AND DISTRIBUTED PROCESSING IN AN INDUSTRIAL CONTROLLER ENVIRONMENT", the entirety of which is incorporated herein by reference.

TECHNICAL FIELD

The present invention relates generally to industrial control systems, and more particularly to a system and methodology to facilitate distributed component processing in a networked industrial controller system.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values. Control programs may be executed in a series of execution cycles with batch processing capabilities.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

Various control modules of the industrial controller may be spatially distributed along a common communication link in several racks. Certain I/O modules may thus be located in close proximity to a portion of the control equipment, and away from the remainder of the controller. Data is communicated with these remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, etc.), ControlNet®, DeviceNet® or other network protocols (Foundation Fieldbus (H1 and Fast Ethernet) Modbus TCP, Profibus) and also communicate to higher level computing systems. Industrial controllers utilize the aforementioned technologies along with other technology to control multiple applications ranging from complex and highly distributed to more traditional and repetitious applications.

At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/ or other data types to name but a few examples.

User programs are generally distributed or downloaded to PLCs in a point-to-point manner, wherein respective applications are tested and put into operation in accordance with an isolated integration process. Many times a trial and error process is employed, whereby individual stations in a control process are tweaked or tuned as necessary—during start-up of an application involving several and often times remote PLCs. Thus, if several PLCs control an overall manufacturing process, application distribution and testing is often limited to loading PLCs individually and then tweaking individual control stations locally to facilitate the overall manufacturing or control process. In many cases, some PLC stations run at peak capacity, whereas other controllers in the process are lightly loaded. Moreover, in the process of downloading, testing and ultimately deploying an application, coordination between components is limited due to the manual nature of the aforementioned integration processes.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to provide a flexible application distribution framework to support distributed processing and configuration within an industrial controller environment. Several re-locatable components interact and communicate to determine system impacts (e.g., performance, load, configurations) in single or multi-processor environments in order to automate application or component distribution, testing, and configuration in accordance with coordinated component interactions. The components can include a query component to determine relevant information from a controller, a distribution component to direct applications, configurations, and/or portions thereof to respective controllers, a configuration component to coordinate/update features within the controllers (also associated modules), and an analysis component to determine and control one or more performance or deployment aspects of a distributed system. Interactions can occur across networks (local and/or remote), protocols, and interface technologies, wherein automated protocol selections can be made. These interactions also support processor capabilities being determined, updated and/or shared, while coordinating system performance/component integration across multiple platforms to mitigate manual deployment and testing processes.

In accordance with one aspect of the present invention, the query component can employ resource lists or locators to determine current controller resources such as processing capabilities, components installed, current configurations, for example, and collect customer data, if desired. This can include a controlled query of a data path to a network device that can also facilitate interactive fault handling over a network and between various components residing thereon. In addition, an XML schema can be provided to transport and specify system resources that are sought by and subsequently processed by the query component.

The distribution component facilitates several configuration and application deployment aspects of the present invention via a deployment engine that distributes components across a coordinated control environment. Component deployment can occur in connection with the queried resources and/or determinations by the analysis component, and also occur as part of a scheduled process or routine. This includes system reconfigurations, configuring systems from remote web locations, load balancing processor capabilities across systems, and general software or configuration deployments. Other configuration aspects include configuring multiple stations in support of a more consistent processing load. This can include relocating and redistributing tasks in accordance with logical and physical processor or component locations. Another aspect includes pushing code and associated data between devices to further distribute and balance processing capabilities in addition to supporting more continuous process controls.

The configuration component supports such aspects as network clock synchronizations, clock updates, and employment of an automated protocol selection procedure. This can include configuring an Ethernet or other type device for example, to translate a first protocol to a plurality of various other communications protocols. Additionally, Dynamic Host Configuration Protocols (DHCP) can be employed in accordance with other aspects of the present invention to facilitate more automated determinations of network configurations.

In support of the query, distribution, and configuration components, the analysis component includes various system processing aspects of the present invention. This can include applying artificial intelligence techniques to processing/deployment decisions including such techniques as Bayesian analysis and belief networks. This type analysis can be harnessed to determine such aspects as data prioritization, communication management and priority between recipients, as well as managing one or more events based upon the determined priority. Other analysis aspects can include transforming data between protocols such as XML and local controller protocols to facilitate more efficient processing of data acquired from multiple sources.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology facilitating flexible resource distribution and control in an industrial control environment. A query component is provided to determine one or more system resources from a networked industrial controller system. The resources can include applications, configurations, variable settings, and performance capabilities associated with a controller, for example. Upon receiving available resource listings from various control devices, a distribution component can update the devices based in part on the resource listings and/or other considerations and according to various criteria such as load balancing considerations, software deployment considerations, and efficiency of process considerations. A configuration component can be utilized in the controller system to provide network updates of controller parameters and to facilitate automated protocol selections when interacting with out-of-network devices. An analysis component can interact with the query, distribution, and configuration components to support higher-level decision-making in the resource distribution and allocation process.

Figure 1:
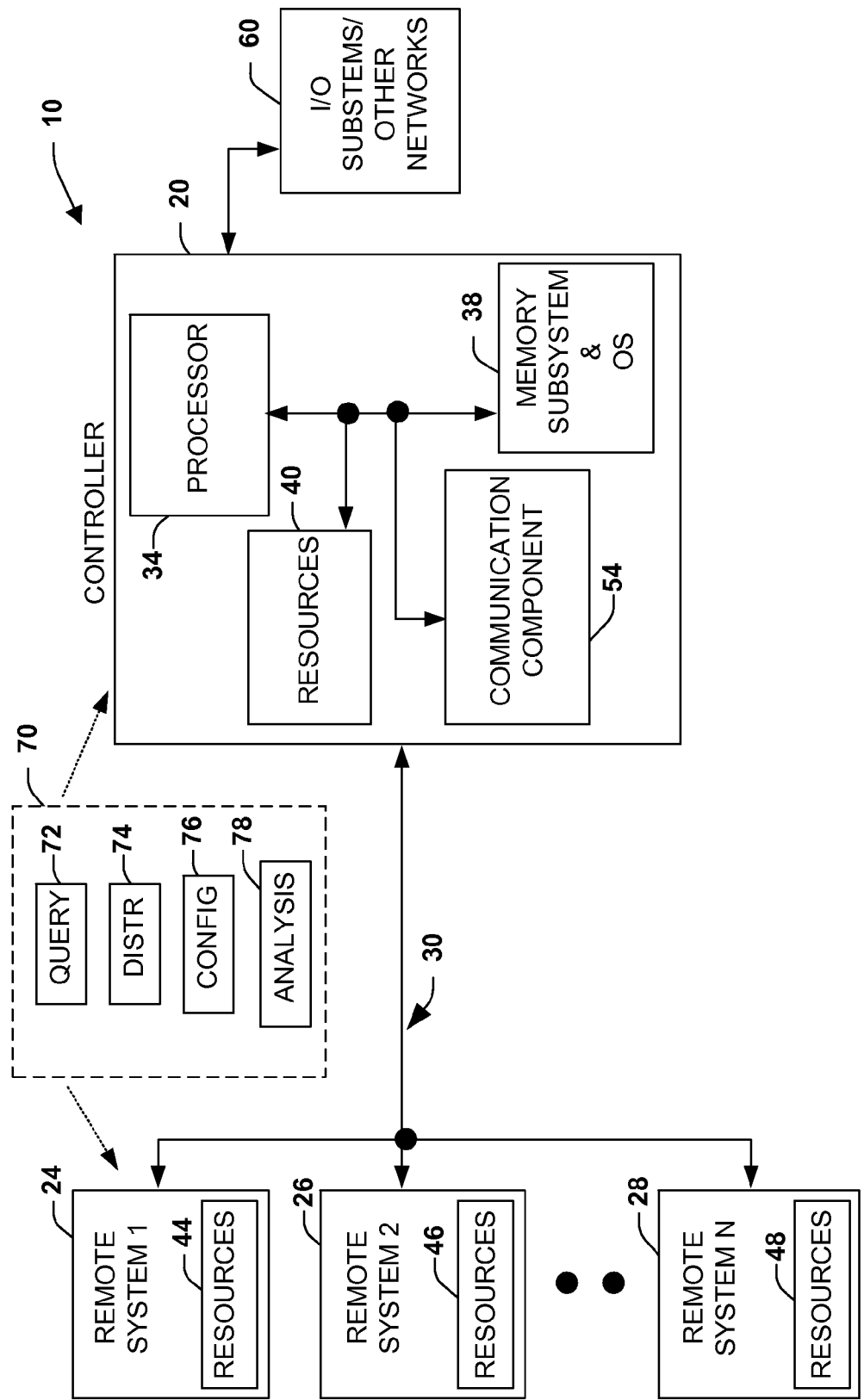
FIG. 1 is a schematic block diagram illustrating an industrial controller and distribution architecture in accordance with an aspect of the present invention.

Referring initially to FIG. 1, an industrial control and distribution system 10 is illustrated in accordance with an aspect of the present invention. The system 10 includes an industrial controller (e.g., PLC, PC-based controller or equivalent) 20 communicating to one or more remote systems 24-28 across a local factory and/or a public network 30 such as the Internet. This can also include other communications options such as phone connections and/or wireless connections. A processor 34 (or processors) in the controller 20 executes from an associated memory subsystem 38 that can also include an operating system (e.g., Microsoft® Windows® NT/2000/XP, Windows CE, Linux, .NET, OS-9, UNIX, VRTX, QNX, VxWorks, CE.NET, custom-designed).

The controller 20 and remote systems 24-28 maintain resources 40 through 48, wherein the resources are associated with various operational aspects of the systems. For example, the resources 40-48 can include memory/memory capacity, processor bandwidth or utilization information, programs, variables, configurations, process information, batch information, I/O lists, scan lists, and substantially any parameter and/or data that affects operational capabilities of the respective systems. As will be described in more detail below, the resources 40-48 can be described in a schema or list and passed between systems 20-28 in order to distribute one or more resource parameters or capabilities across one or more of the systems 20-28. It is noted that the remote systems 24-28 can be substantially any network device interacting with the controller 20. This can include personal computers, workstations, other controllers, communications modules, and so forth.

As an example, remote system 2 at reference numeral 26 can be another controller, wherein the controller 20 and remote system 2 (or other systems) exchange resource information to determine if the resources 40 and 46 can be transferred, shared, updated, and/or coordinated to facilitate an automated manufacturing process. In addition, one controller can act as a master, whereby other controller systems interacting on the network 30 are synchronized or updated based at least in part on the resources maintained by the master. In another example, remote system 1 at reference numeral 24 can be configured as a network computer that maintains one or more lists of resources associated with one or more controllers or other network devices. If conditions change, such as a detected change in load, change in logic programs, change in firmware revision, a design change, configuration change and/or other changes, the network computer can distribute resources to the controllers in accordance with the lists (or other determinations) via a remote task such as a remote web service.

A communications component 54 associated with the controller 20 (or remote systems) can be configured in one or more possible communications modalities such as a web server/client, e-mail server/client, voice mail server/client, and dial-in server/client, for example, wherein the modalities can be adapted in one or more possible modes such as polling modes, broadcasting modes, and/or request/reply modes to distribute, monitor, and/or exchange resources between remote systems 20-28. Although not shown in FIG. 1, the remote systems 24-28 can have similar communications capabilities as the controller 20. It is also noted that the controller 20 can communicate to various Input/Output subsystems 60 and/or other networks to control portions of a distributed manufacturing process (e.g., Analog, Digital, Programmed/Intelligent I/O modules, other programmable controllers, communications modules, networks).

According to one aspect of the present invention, a coordination component 70 is provided to support flexible exchanges of data and/or capabilities between the controller 20 and remote systems 24-28. The coordination component 70 includes at least one of a query component 72, a distribution component 74, a configuration component 76, and an analysis component 78. It is noted that the respective systems 20, and 24-28 can be configured similarly (e.g., all systems include components 72 through 78, all systems include at least component 74, and so forth), and/or can be configured having various combinations of components 72 through 78. For example, the controller 20 can be configured with the components 72 through 78, remote system' with components 76 and 78 and remote system$_2$ with components 72, 74, and 78.

The query component 72 retrieves resource schemas, lists, data and/or locators (e.g., address pointers) from network devices to determine current controller resources (or other network device resources) such as processing capabilities, components installed, current configurations, and customer data, for example. This can include a controlled query of a data path to a network device over the network 30 and between various components communicating thereon. Queries can include sending query requests to dedicated IP addresses, according to address lists specifying several devices, and/or other type requests such as a dial-up request to a specified number, number list and/or a wireless request to a Wireless Area Network device (e.g., employing Wireless Markup Language (WML) schema). As will be described in more detail below, the query component 72 can receive a response to the resource request via an XML schema or other data transmission.

The distribution component 74 facilitates deployment of resources 40-48 via a deployment engine (described below) that distributes one or more of the resources across the network 30 and between one or more of the controller 20 and/or remote systems 24-28. Resource deployment can occur in connection with the query requests described above, for example, and/or also occur as part or a scheduled process or routine. This includes system reconfigurations, configuring systems from remote web locations, load balancing processor capabilities across systems, and general software or configuration deployments. The configuration component 76 supports coordination of resource configurations and/or settings across the system 10. This can include such aspects as network clock synchronizations, clock updates, configuration updates, and/or employment of an automated protocol selection procedure, for example, which are described in more detail below.

The analysis component 78 supports the query, distribution, and/or configuration components 72-76, including various system processing aspects such as determining system performance and/or distributing resources or processing capabilities. This can include applying artificial intelligence techniques to processing decisions including such techniques as Bayesian analysis and belief networks. Determinations include such aspects as load sharing analysis, resource allocation analysis, data prioritization, communication management and determining priority between recipients, as well as managing one or more events based upon the determined priority.

Figure 2:
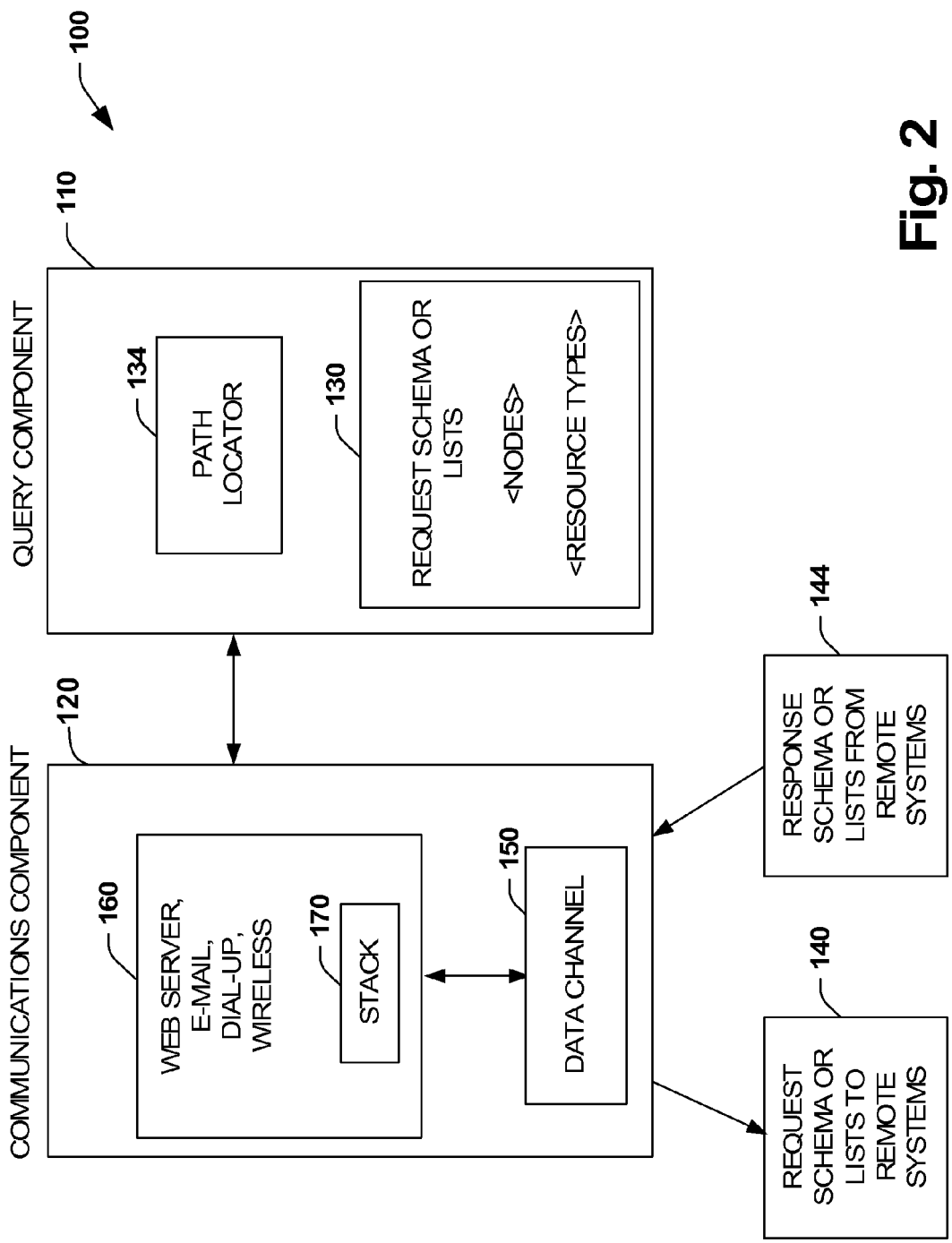
FIG. 2 is a schematic block diagram illustrating a query system in accordance with an aspect of the present invention.

Referring to FIG. 2, a system 100 illustrates a query component 110 and remote communications in accordance with an aspect of the present invention. The query component 110 interacts with a communications component 120 to transmit resource requests and receive resource responses from one or more remote systems (not shown). In addition, the query component 110 can configure a request schema 130 having one or more XML elements (defined by starting and ending tags with (</>symbols), arranged in substantially any order) that relate to one or more remote system nodes and associated resource types. Although not shown, the XML elements and associated tags can also include attribute information if desired, wherein an attribute is a name-value pair associated with an element start tag (e.g., <resource type memory="10 Mbytes">, <resource type CPU utilization="20%">).

A path locator 134 can be provided to indicate one or more node addresses and/or connection types/devices within the schema 130. The communications component 120 employs the path information in the schema 130 to retrieve resource information from the remote systems via a request at 140. It is to be appreciated that a single schema 130 can be broadcast to multiple nodes in performance of a query, or individual schemas can be sent to query a single node, if desired, wherein one or more remote system responses can be received at 144. The remote responses can also be in the form of XML schemas having path information describing where the response 144 originated from and including associated resource information relating to a respective node. It is noted that the responses 144 can include XML data and/or combinations of other data such as having an attached binary file that follows the response 144. For example, an element in the response 144 can specify whether the queried data is included in the XML schema or is included as an attachment thereto. As an example, coded information such as an executable may be transmitted in binary. Thus, an element in the response schema can indicate that one or more attached binaries follow the response at 144.

The communications component 120 interacts with the query component 120 in order to retrieve requested resource information. A data channel 150 (or data channels) can be configured to communicate with the remote systems via a communications processor 160. As illustrated, the communications processor 160 can be configured or adapted for a plurality of various communications options or combinations thereof such as a web server/client, e-mail server/client, dial-up server/client, wireless access server/client, and so forth, wherein respective server/client components can send information to and receive information from multiple remote systems. The data channel 150 can include at least one standard socket (e.g., HTTP) for web communications and/or other type sockets (e.g., Secure Socket Layer SSL Socket) to exchange information with remote systems. For example, the standard socket can be an HTTP socket, an FTP socket, a TELNET socket, and/or other network socket.

The communications processor 160 includes a socket interface (not shown) that directs/translates industrial controller communication protocols to/from TCP/IP (or other protocol) and is instantiated by a stack 170. For example, a socket instance, which may be invoked from a remote browser and/or other application, includes information about a controller such as an IP address and port address. The stack 170 presents a layered communications interface to networks such as the Internet and may interface to one or more drivers to communicate with remote systems. One possible driver is a point-to-point (PPP) driver (not shown) for communicating over a phone line. Another possible driver is an Ethernet driver (not shown) that communicates through a Local Area Network (LAN) to remote systems. It is to be appreciated that a plurality of other drivers and network interfaces are possible (e.g., wireless LAN driver).

The stack 170 (e.g., TCP/IP stack) may be associated with one or more other network layers. A physical layer may be provided that defines the physical characteristics such as electrical properties of a network interface. A data-link layer defines rules for sending information across a physical connection between systems. The stack 170 may include a network layer, which may include Internet protocol (IP) that defines a protocol for opening and maintaining a path on the network. A transport layer associated with the stack 170 may include Transmission Control Protocol (TCP) (or other protocol) that provides a higher level of control for moving information between systems. This may include more sophisticated error handling, prioritization, and security features. A session layer, presentation layer, and application layer may also be optionally included that sit above the stack 170.

Figure 3:
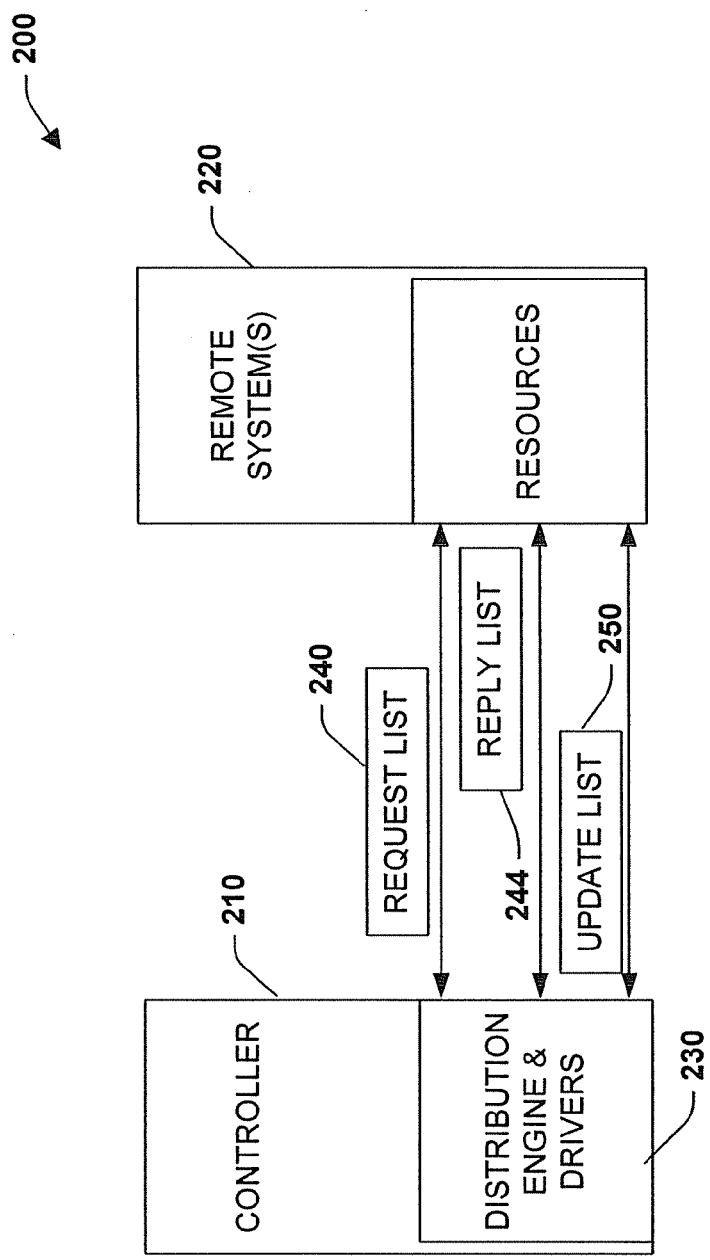
FIG. 3 is a schematic block diagram illustrating a distribution system in accordance with an aspect of the present invention.

Referring now to FIG. 3, a deployment system 200 is illustrated in accordance with an aspect of the present invention. Although resource distribution is depicted between a single controller 210 (or network device) and a remote system 220, it is to be appreciated that the controller may distribute resources to a plurality of such systems. A two-level architecture 230 may be provided including a distribution engine and drivers to propagate resources to/from remote systems 220. For example, there may be a distribution driver for respective resource types (e.g., files, controller settings, data table, memory, customer-specified data, system performance parameters such as processor/memory utilization and so forth). The drivers may be responsible for reading and writing resource types, wherein the distribution engine may be responsible for coordinating resource distributions among drivers, remote systems, and associated data paths. One or more schemas or lists (e.g., XML) can be provided to facilitate communications and resource distribution to, from and/or between the remote systems 220 and/or controller 210. For example, this may include: a request list 240 (e.g., describing one or more available resources from controller, requesting desired or potential resources from remote systems), a response list 244 (e.g., resources actually available from the remote system, resources needed by the remote system), and/or an update list 250 (e.g., actual resources sent to and/or received from remote systems and/or may contain pointers to external storage locations, controller sites, and/or network devices).

The distribution system 200 can operate in a plurality of modes to propagate changes throughout the remote systems 220. For example, an automatic mode may be provided which enables updates to occur when new or changed resources have been provided to the controller 210 and/or remote systems 220. Also, there may be a synchronization mode, which may run a check of resource items (e.g., at predetermined intervals, when changes are detected, via programmed logic instructions) against other remote systems to facilitate sharing and/or balancing of resources between systems. During a distribution between systems, the request list 240 may be sent to the remote system 220 from the controller 210, for example. The remote system may then check its own resources and reply with the response list 244 that requests resource changes needed. The controller 210 may then respond with the update list 250 providing the information requested for that update. During an automatic or scheduled distribution, the distribution engine may send update lists 250 to one or more remote systems 220 informing them of changes as they occur on the controller 210. For example, the update list 250 may be an XML blob that describes what the update is, what data is being updated, and the actual update— if desired. There may be an action parameter or flag (not shown) that describes how the updated item should be handled during automatic updates. For example, the parameter's value may be configured to a first value to update and/or change an existing item, configured to a second value to delete an existing item, and/or configured to a third value to create a new item. It is to be appreciated that resource allocation can occur in a bi-directional manner in accordance with the present invention, whereby the controller 210 and/or the remote systems 220 can request for and/or respond with one or more available resource items.

Figure 4:
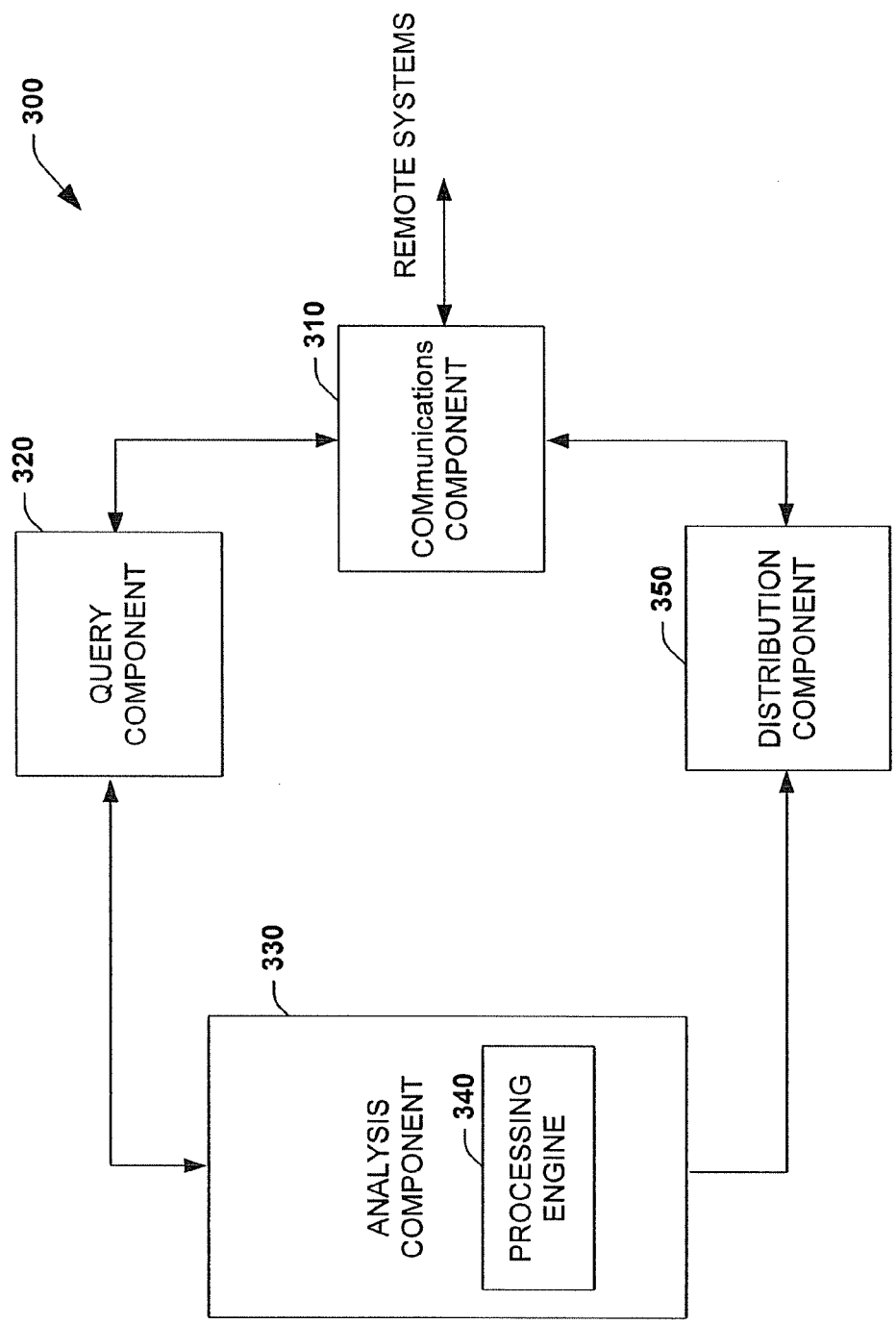
FIG. 4 is a schematic block diagram illustrating an analysis system in accordance with an aspect of the present invention.

Referring to FIG. 4, an analysis system 300 is illustrated in accordance with the present invention. The system 300 includes a communications component 310 to interact with one or more remote systems (not shown). A query component 320 determines available resources associated with the remote systems via the communications component 310, wherein an analysis component 330 employs a processing engine 340 to automatically and dynamically coordinate processes/resources between industrial controllers and/or other remote systems. A distribution component 350 is provided to adjust resources between one or more systems based upon commands received from the analysis component 330. It is to be appreciated however, all or portions of query and/or distribution functionality can be provided within the analysis component 330.

The analysis component 330 monitors/determines overall system 300 performance/resources via the query component 320 and alters, adjusts, and/or tunes the performance based on decisions determined in the processing engine 340. For example, this can include rules-based determinations (e.g., if this queried condition or event occurs, then perform one or more distribution actions), algorithmic determinations, and/or other determinations such as statistical analysis, probabilistic analysis, and/or higher-level inference analysis that may be applied in accordance with artificial intelligence techniques which are described in more detail below.

Based on an analysis of the system resources, the processing engine 340 can perform a plurality of various actions to cause changes in system performance and/or configuration. It is to be appreciated that changes can also occur based upon regularly scheduled events such as routine maintenance conditions (e.g., flag fired from a timer or a calendar) and/or in accordance with predetermined time intervals. As an example, system reconfigurations are possible wherein one or more remote systems are updated according to changes detected by the analysis component 330 (manual and/or automatic changes) that includes distributing such items as programs, firmware, configuration settings, general software deployments and/or other data. This can also include configuring systems from remote web locations such as from a workstation or a controller. In another aspect, processor capabilities can be load balanced or distributed across systems. As an example, a remote station may indicate that its memory is about full (e.g., via query and associated schema). The analysis component 330 can then query other systems and/or stations for available storage capacity, find an available location for storage, and communicate an address listing the site whereby the remote system can possibly offload data stored therein. As an example, a static recipe, batch file, a help file, or other type data may be accessed infrequently. Thus, offloading storage of this type data may not cause any decrease in performance when the remote system needs to access such data during the course of operations.

In another example, a remote system may indicate that a processor is executing at 98% of available processing bandwidth. This may involve a large amount of network processing, wherein the remote system is reading commonly available network data and performing large amounts of data processing on the data to produce and return the result back to the network. The analysis component 330 can query other remote systems, determine a processor that has available bandwidth and offload the task to that system. This can include relocating and redistributing tasks in accordance with logical and physical processor or component locations. In one aspect, this can include bundling code and associated data (e.g., pushing a copy of a logic program or processor executable instructions onto a communications stack) on the overburdened machine and transferring the bundled code and associated data between devices to further distribute and balance processing capabilities. In this manner, more continuous and/or balanced process controls can be provided. In addition, the system 300 enables automatic tuning and/or dynamic regulation of an overall process that is controlled by multiple systems. Other configuration aspects include configuring multiple stations in support of a more consistent processing load. It is noted that load balancing can also occur by having multiple processors execute similar tasks, wherein tasks are selectively enabled and disabled by the analysis component 330.

In support of the query, distribution, and configuration components, the analysis component 330 and processing engine 340 include other system processing aspects. This can include applying artificial intelligence techniques to processing/deployment decisions including such techniques as Bayesian analysis and belief networks. This type analysis can be employed to determine such aspects as data prioritization, communication management and priority between recipients, as well as managing one or more events based upon the determined priority. Other analysis aspects can include transforming data between protocols such as XML and local controller protocols to facilitate more efficient processing of data acquired from multiple sources. For example, a plurality of XML files, schemas or blobs may be received from remote systems describing various resources. Although the XML data can be processed in its present form, it may be more efficient to transform all or portions of the data to a different form such as a binary file, HEX file, a structure, an array, and/or other form before processing begins. This can include applying higher level language functions (e.g., convert ASCII to binary ( ), define structure, format array) that are commonly available in compiled code such as object languages, C and C++, for example. This can also include instruction sequences that input a known code type (e.g., XML), and maps the code type to one or more other code types in accordance with the mapping (e.g., characters such as 20 followed by % maps ASCII 20 into binary 20 followed by multiplication of 0.01).

In accordance with one aspect of the present invention, system performance can be determined in a regular manner according to a regular query of resources initiated by the analysis component 330. For example, inputs, data, a sequence of data, a variance of data and/or patterns of data or inputs can be monitored for possible trends in the data (e.g., at about 2:00 AM, processor at station B experiences a dramatic decrease in CPU capacity). This can include statistical or probability analysis to determine if a possible performance and/or distribution condition has occurred. As one particular example, resource or other type data can be monitored over time, whereby if the data falls outside of a predetermined range, an outside range event is generated and subsequently processed by the processing engine 340. However, this data may generally subscribe to a detectable, modeled, and/or predictable pattern during normal operations within the range. Thus, if the pattern changes—even though the data is still within the predetermined range, a different type event can be triggered causing different decisions to be executed in the processing engine 340.

These type decisions can include inference, statistical, and/or probability analysis at 340 for a subset of resources, data or inputs that are queried and monitored for routine or modeled patterns over time. If the data subset deviates from the determined pattern, internal events can be fired in the processing engine 340 that invoke one or more actions such as searching for other available resources, transferring processing capabilities between stations, putting additional processors online, and alerting other systems or users, for example. Data patterns can be determined in accordance with a plurality of techniques. A statistical analysis of data or inputs can include substantially any technique such as averaging, standard deviations, comparisons, sampling, frequency, periodicity and so forth.

In another aspect of the present invention, data patterns (e.g., patterns of queried resources over time) or processor/system operations can be stated as a general probabilistic estimate to determine a performance condition given monitored evidence of an input pattern or occurrence. The estimate can be stated as:

Example 1

$$Pr(Cp|E_1, E_2, \ldots E_J);$$

wherein Pr is a probability, Cp relates to a monitored performance condition given evidence E relating to deviations or differences from monitored patterns or models, and J being an integer. This can also include evidence of consistency with a previous pattern to predict likely future outcomes or performance conditions. Thus, probability thresholds can be configured that fire an internal event (leading to action) based upon the probability estimate being above a predetermined probability threshold (e.g., 90% determination system performance condition or data pattern will likely occur in the future based on previous patterns).

It is noted that probability models can be constructed from typical controller or system operations. This can include monitoring resources for typical variances and monitoring such aspects as how often particular events occur (e.g., processor at station C produces 1 less product per minute when processor D an E increase network communications). In addition, inference models can be constructed such that multiple and/or unrelated events are analyzed (e.g., processor A an B generally operate independently of processor C and D, thus there generally should not be any cause and effect between system operations). This can possibly indicate that a problem may occur or that resources may need to be allocated in a different manner (e.g., when processor A executes batch T, send system flag to processors C and D to reduce network communications by 25%). For example, if a large increase in network communications is detected, and an associated decrease is detected with the number or type of I/O samples received over time, then a possible inference is that system processing capabilities have become overloaded or network activities have induced noise problems in the I/O subsystem. It is to be appreciated other inferences can occur and that more or less general inferences can also be determined.

Classification models can be constructed that learn routine behaviors or patterns in order to generate probabilities that predict possible future patterns. For example, such techniques can include Support Vector Machines (SVM), Naive Bayes, Bayes Net, decision tree, similarity-based, vector-based, and/or other learning models or combinations thereof. Classifiers can be stated as a function that maps an input attribute to the confidence that the input belongs to a class. In the case of pattern recognition, attributes can be typical data subsets or values sampled over the course of time (e.g., resources queried from a plurality of systems at predetermined intervals) and/or include other pattern-specific attributes derived from the data subsets. It is noted, that modeled patterns and/or the analysis described above can cause automated actions to occur to more evenly and/or efficiently execute a manufacturing process. Alternatively, modeled or determined tendencies can be reported to users or operators, wherein a manual flag can be set by the user—before automated actions begin, in order to indicate that it is a suitable time to implement a possible automated action (e.g., implement processor load sharing during plant maintenance operation).

Figure 5:
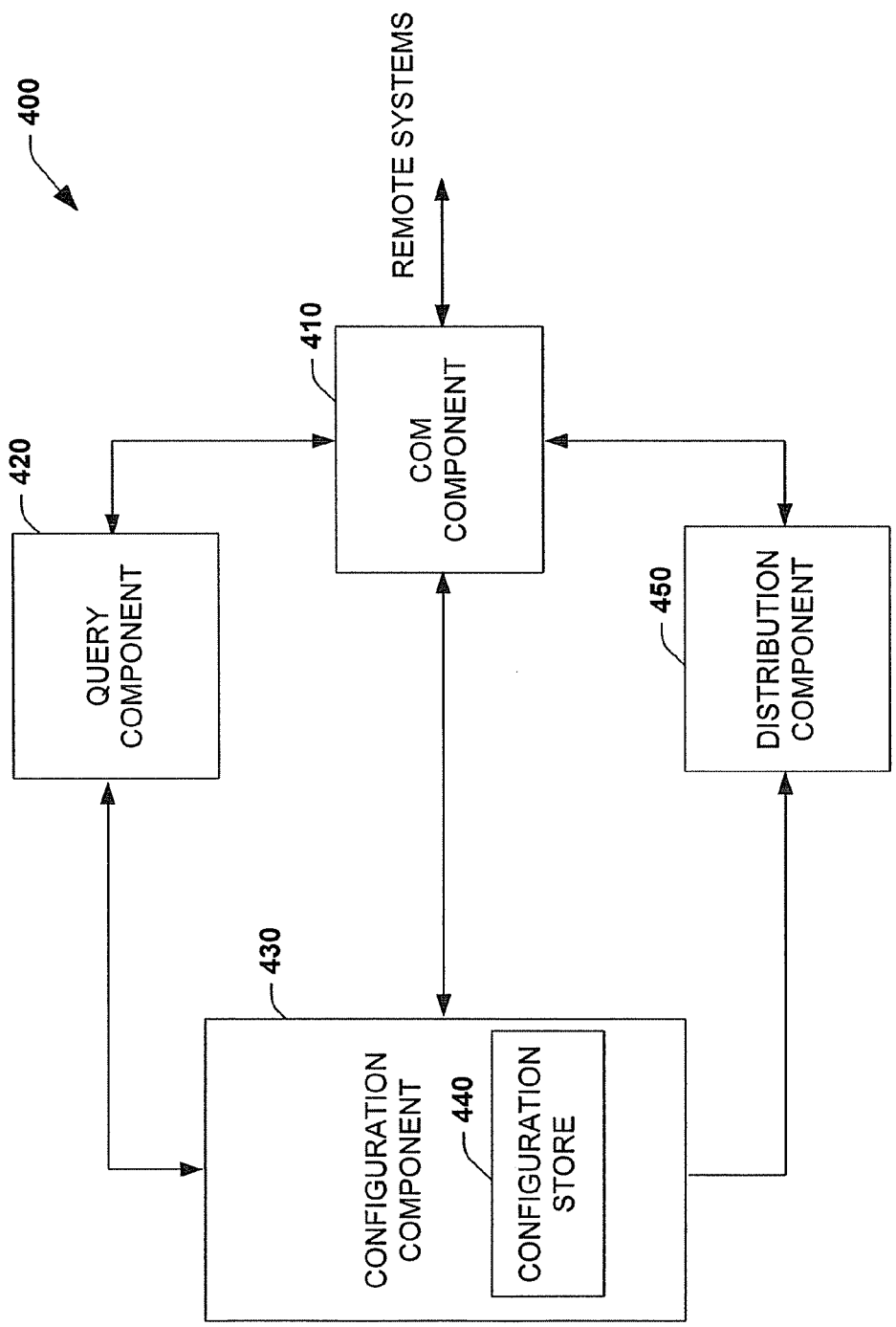
FIG. 5 is a schematic block diagram illustrating a configuration system in accordance with an aspect of the present invention.

Turning now to FIG. 5, a configuration system 400 is illustrated in accordance with the present invention. The system 400, which operates similarly to the analysis system described above, includes a communications component 410 to interact with one or more remote systems (not shown). A query component 420, can be optionally provided to determine available configurations associated with the remote systems via the communications component 410, wherein a configuration component 430 employs a configuration store 440 to coordinate configurations between industrial controllers and/or other remote systems. The configuration store 440 can include such aspects as system parameters, settings, protocol configurations, and/or other system data. Thus, if changes are detected in the configuration store 440, configuration updates can be initiated to other systems. As noted above, updates can occur periodically, wherein at predetermined or scheduled intervals, one or more remote systems are updated in accordance with at least a portion of the contents of the configuration store 440.

A distribution component 450 can also be provided to adjust configurations—which can include one or more of the resources described above, wherein adjustments are provided to one or more remote systems based upon commands received from the configuration component 430. It is also to be appreciated however, all or portions of query and/or distribution functionality can be provided within the configuration component 430. In addition, the configuration component 430 can cooperate with the analysis component described above to determine if one or more configurations or settings should be propagated to other systems.

The configuration component 430 supports such aspects as network clock synchronizations, clock updates, and employment of an automated protocol selection procedure. This can include reading remote web locations for a standard time, (e.g., Greenwich Standard Time) and propagating the time between systems with suitable adjustments if necessary for communications delays. Alternatively, the configuration component 430 can induce one or more remote systems via network commands to perform a clock update procedure such as reading a remote web site for the clock data, and/or performing a real time update in accordance with a localized clock or shared signal.

In another aspect, the configuration component 430 can cause the communications component 410 to alter communications protocols in order to communicate with various remote networks. This can include configuring an Ethernet or other type device for example, to translate a first protocol to a plurality of various other communications protocols. For example, one remote system may be adapted for communications on a gateway or local wireless network. The communications module 410 upon receiving a command from the configuration component 430, can switch protocols at runtime if desired, and does not necessarily require a device reboot, re-initialization, and/or power cycle, from a standard network protocol (e.g., Ethernet/IP), to a native protocol employed by the remote system such as an alternative Ethernet application-layer protocol delivered via standard Ethernet TCP/IP/UDP messaging and data exchange (e.g., Modbus/TCP (Modbus on TCP), NDDS, ProfiNet, and others of the like). The remote system can be configured to communicate upon receiving a network command sequence in its native protocol, yet, ignore standard protocol commands. Alternatively, the communications component 410 can induce a remote network switch to activate when attempting to access the remote system in its native protocol (e.g., electronic switch that switches from network connection A to connection B).

In another aspect of the present invention, Dynamic Host Configuration Protocols (DHCP) can be employed in accordance with the configuration component 430, the communication component 410 and/or distribution component 450 to facilitate more automated determinations of network configurations. Dynamic Host Configuration Protocol is a communications protocol that enables automation of assignment of Internet Protocol (IP) addresses in a controller network. Utilizing the Internet Protocol, respective machines that can connect to the Internet generally require a unique IP address. Thus, without DHCP, IP addresses may have to be entered manually at respective controllers/computers and, if computers move to another location in another part of the network, a new IP address is subsequently entered. DHCP facilitates distribution of IP addresses from a central point and automatically sends a new IP address when a network device such as a controller is coupled into a different place in the network. DHCP also supports static addresses for devices containing web servers that need a permanent IP address. DHCP can be employed as an alternative to other network IP management protocols, such as Bootstrap Protocol (BOOTP) that is also supported by the present invention. Although, DHCP may be considered a more advanced protocol, both configuration management protocols are commonly employed. It is noted that a DHCP or BOOTP client is a program that is located in (can be downloaded via distribution component 450) respective controllers or remote systems so that it can be configured.

Figure 6:
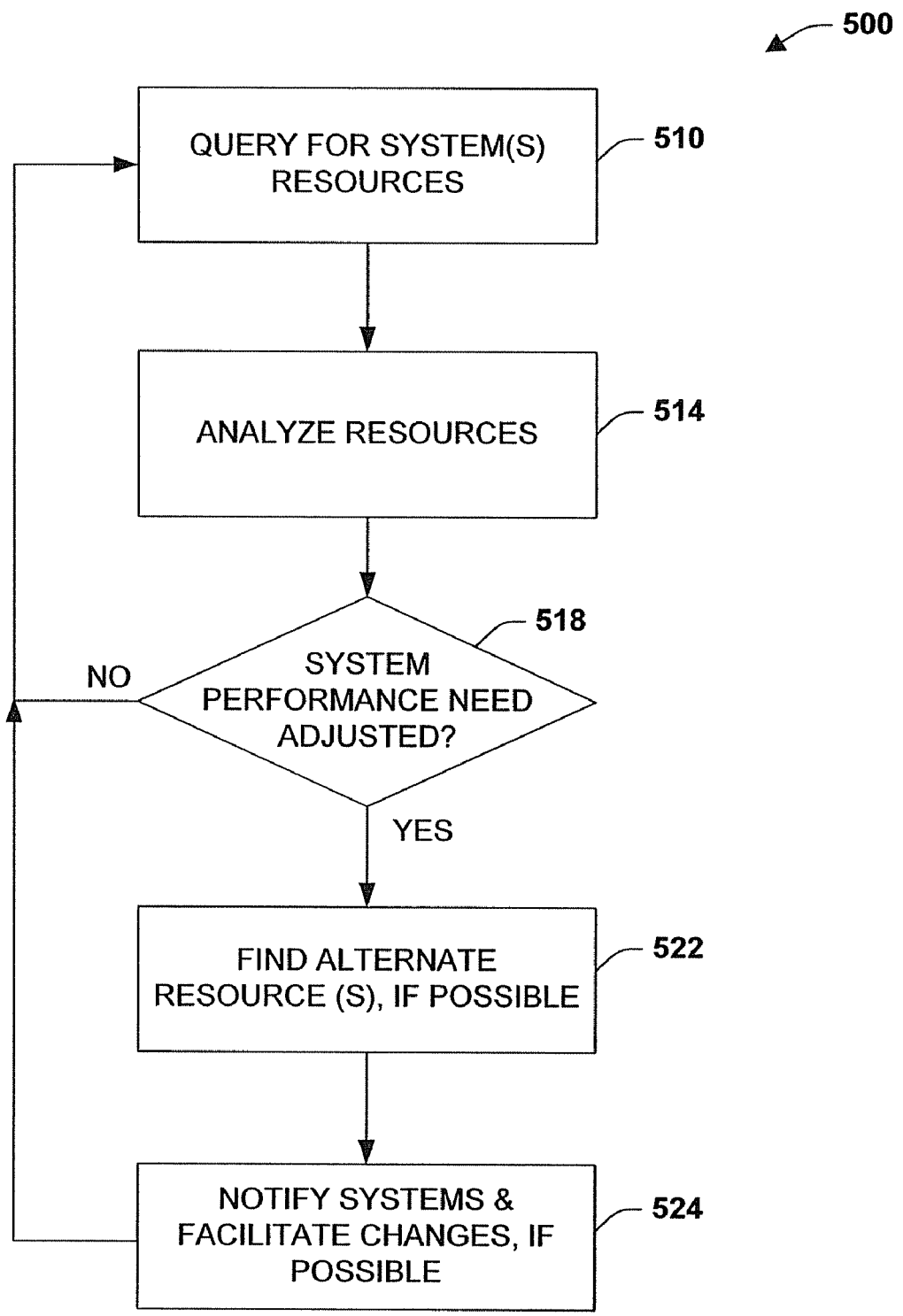
FIG. 6 is a flow diagram illustrating resource processing and distribution in accordance with the present invention.
Figure 7:
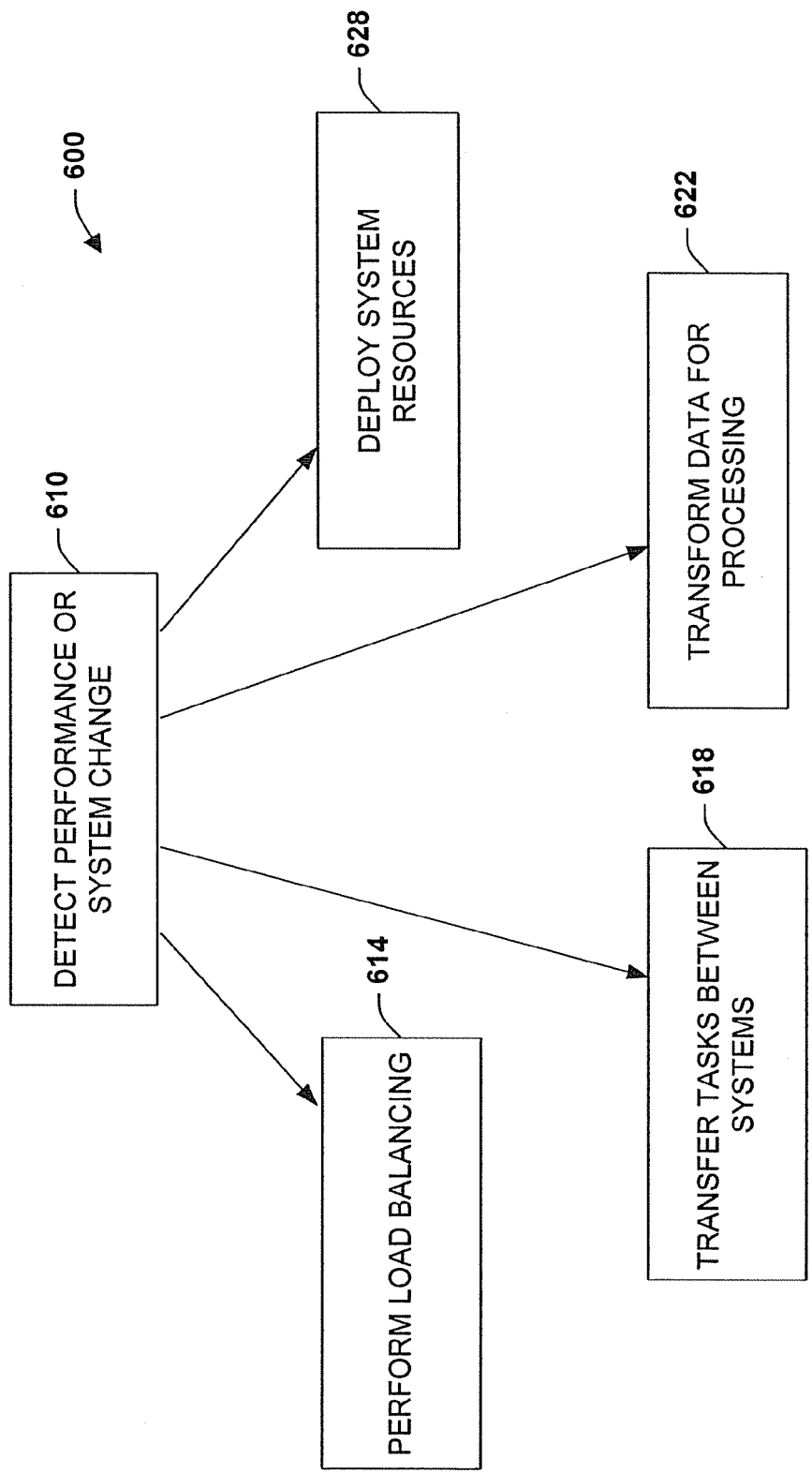
FIG. 7 is a flow diagram illustrating system processing in accordance with the present invention.
Figure 8:
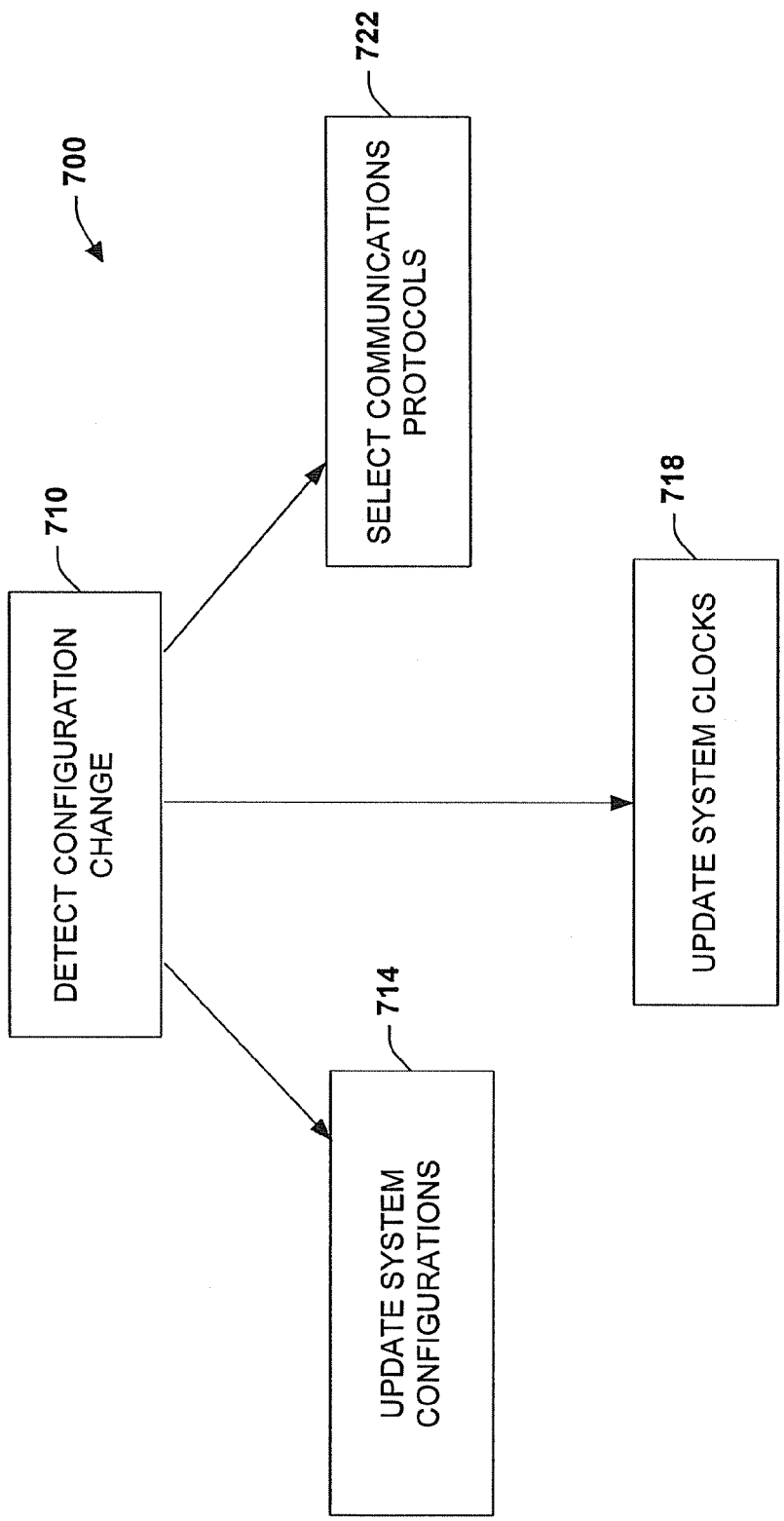
FIG. 8 is a flow diagram illustrating configuration processing in accordance with the present invention.

FIGS. 6-8 illustrate flexible distribution methodologies in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 6 is a diagram 500 illustrating resource processing and distribution in accordance with an aspect of the present invention. At 510, a query is directed to one or more remote systems, wherein the query can be broadcast and/or directed to respective systems individually. At 514, the queried resources are analyzed according to one or more of the analytical techniques described previously. At 518, a determination is made as to whether system performance needs adjustment based upon the resource analysis performed at 518. If not, the process proceeds back to 510. If an adjustment is determined at 518, the process proceeds to 522. At 522, alternate resources are determined from other systems, if possible. For example, all available resources may be fully utilized. If a resource is available at 522, the process notifies respective systems and facilitates any changes between systems, if necessary (e.g., transferring tasks between systems). It is also possible to send a network command to several systems causing the systems to exchange resources between the systems so commanded.

FIGS. 7 and 8 illustrate several performance/system and configuration change possibilities in accordance with the present invention. FIG. 7 is a diagram 600 illustrating possible system/performance change options or procedures that can be automated via one or more of the components previously described. At 610, performance or system changes are detected. This can be based on automated commands, running comparisons between a master file and remote resources, and/or in accordance with manual commands causing a system to be updated or reconfigured in accordance with a newly added file or data. If a change is detected at 610, one or more of the following automated procedures can be executed. At 614, load balancing can be performed, wherein processing capabilities are distributed between systems. This can include transferring one or more tasks between systems at 618. Another aspect includes performing data transform operations at 622 to facilitate more efficient processing. At 628, one or more resources can be deployed between systems such as software resources, parameters, files, firmware, data, programs, and other information (e.g., maintenance schedules, batch files).

FIG. 8 is a diagram 700 illustrating possible configuration change options or procedures that can be automated via one or more of the components previously described. At 710, configuration changes are detected. This can be based on automated commands, running comparisons between a master file and remote resources or configuration files/parameters, and/or in accordance with manual commands causing a system to be updated or reconfigured in accordance with a newly added configuration or data. If a change is detected at 710, one or more of the following automated procedures can be executed. At 714, system configurations can be updated such as data table files, status bits, diagnostic bits, processor configuration variables/bits, and substantially any parameter affecting operation of a coordinated networked system. Another aspect includes performing system clock updates at 718 as described above. At 722, one or protocols or communications options can be selected. This can include converting, mapping, and/or translating from one communications protocol to another and can include such aspects as employing DHCP and/or BOOTP protocols to facilitate system network configurations.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method to facilitate resource distribution in an industrial controller system, comprising:
    automatically querying a plurality of resources from a networked industrial control system;
    automatically analyzing the plurality of resources to determine an available resource, the analyzing comprising (i) at least one of rules-based determining, statistical determining, probabilistic determining, or inference-based determining, and (ii) analyzing based on one or more classification models constructed to learn one or more data patterns in order to generate probabilities that predict a possible future data pattern; and
    distributing the available resource within the networked industrial control system to facilitate a coordinated control process.

2. The method of claim 1, the analyzing based on one or more classification models includes analyzing based on at least one of Support Vector Machines (SVM), Naïve Bayes, Bayes Net, decision tree, similarity-based, or vector-based models.

3. The method of claim 1, the statistical determining includes at least one of averaging, determining based on standard deviations, comparing, sampling, determining based on frequency, or determining based on periodicity determinations.

4. The method of claim 1, the probabilistic determining comprising determining a performance condition based on a general probabilistic estimate comprising monitored evidence of an input pattern, the general probabilistic estimate is stated as:

$Pr(Cp|E_1, E_2, \ldots E_J)$;

wherein Pr is a probability, Cp relates to a monitored performance condition given evidence E relating to differences from monitored patterns, and J is an integer.

5. The method of claim 4, the probabilistic determining further comprising predicting a likely future outcome based on monitored evidence that includes data on consistency with a previous pattern.

6. The method of claim 4, the probabilistic determining further comprising triggering an internal event based upon the general probabilistic estimate being above a predetermined probability threshold.

7. The method of claim 1, the inference-based determining includes constructing inference models for analyzing at least one of multiple events or unrelated events.

8. The method of claim 1, further comprising performing at least one of a load balancing operation, a data transform operation, or a resource deployment operation.

9. The method of claim 1, further comprising at least one of automatically configuring system updates, updating system clocks via web services, or automatically selecting at least one of a plurality of communication protocols.

10. The method of claim 9, the selecting at least one of the plurality of communication protocols includes at least one of translating from one network protocol to at least one other network protocol, or activating a remote switch to facilitate communications between networks.

11. The method of claim 9, the configuring the system updates comprises configuring the system updates to occur at times that are at least one of automatically determined and or scheduled as part of a routine activity.

12. The method of claim 1, further comprising automatically configuring at least one Extensible Markup Language (XML) schema to communicate with the plurality of resources.

13. The method of claim 12, further comprising automatically configuring the at least one XML schema to communicate the available resource.

14. The method of claim 1, further comprising automatically propagating the available resource between the networked industrial control system and a remote system.

15. A system to facilitate resource distribution in an industrial controller system, comprising:

means for automatically acquiring a plurality of resources from a networked industrial control system;

means for analyzing the plurality of resources to determine an available resource, wherein the means for analyzing comprises means for learning data patterns to generate probabilities that predict possible future data patterns using at least one of a rules-base determination, a statistical determination, a probabilistic determination, or an inference-based determination; and means for deploying the available resource within the networked industrial control system to facilitate a distributed control process.

* * * * *